United States Patent
Plekhanov et al.

(10) Patent No.: US 12,444,983 B2
(45) Date of Patent: Oct. 14, 2025

(54) HYBRID EM-LC RESONATOR

(71) Applicant: Global Energy Transmission, Co., Woodland, WA (US)

(72) Inventors: Sergey Plekhanov, Moscow (RU); Leonid Plekhanov, Queretaro (MX)

(73) Assignee: Global Energy Transmission, Co., Woodland, WA (US)

( * ) Notice: Subject to any disclaimer, the term of this patent is extended or adjusted under 35 U.S.C. 154(b) by 0 days.

(21) Appl. No.: 18/169,163

(22) Filed: Feb. 14, 2023

(65) Prior Publication Data

US 2023/0378813 A1  Nov. 23, 2023

(51) Int. Cl.
*H02J 50/12* (2016.01)
*H01Q 9/04* (2006.01)
*H02J 50/10* (2016.01)

(52) U.S. Cl.
CPC ........... *H02J 50/12* (2016.02); *H01Q 9/04* (2013.01); *H02J 50/10* (2016.02)

(58) Field of Classification Search
CPC . H02J 50/12; H02J 50/10; H02J 50/50; H04B 5/24; H04B 5/26; H04B 5/263; H01Q 9/04; H01Q 7/00
See application file for complete search history.

(56) References Cited

U.S. PATENT DOCUMENTS

| | | |
|---|---|---|
| 3,201,507 A | 8/1965 | Johnsen |
| 3,946,349 A | 3/1976 | Haldeman, III |
| 4,247,858 A | 1/1981 | Eichweber |
| 5,291,164 A | 3/1994 | Levisse |
| 8,299,654 B2 | 10/2012 | Yamamoto et al. |
| 9,598,945 B2 | 3/2017 | Okoniewski et al. |
| 9,979,239 B2 | 5/2018 | Plekhanov et al. |
| 10,784,584 B1 | 9/2020 | McNutt |
| 2004/0008124 A1 | 1/2004 | Schaefer et al. |
| 2007/0001788 A1 | 1/2007 | Pirard |
| 2010/0194500 A1 | 8/2010 | Suzuki et al. |
| 2011/0140539 A1 | 6/2011 | Yamamoto et al. |
| 2012/0043930 A1* | 2/2012 | Scudiere ............. H02J 50/12 320/108 |
| 2012/0153739 A1* | 6/2012 | Cooper ............... H02J 50/12 307/104 |
| 2014/0091637 A1* | 4/2014 | Endo ................. H02J 50/90 307/104 |
| 2016/0012966 A1 | 1/2016 | Davis |
| 2016/0012967 A1 | 1/2016 | Kurs et al. |

(Continued)

FOREIGN PATENT DOCUMENTS

| | | |
|---|---|---|
| CN | 202678684 U | 1/2013 |
| CN | 111009733 A | 4/2020 |

OTHER PUBLICATIONS

Matos, Taina, Authorized Officer, Commissioner for Patents, "International Search Report" in connection with related International Application No. PCT/US2024/015868, dated Jul. 2, 2024, 3 pages.

(Continued)

*Primary Examiner* — Ryan Johnson
(74) *Attorney, Agent, or Firm* — Kolisch Hartwell, P.C.

(57) ABSTRACT

A hybrid EM-LC resonator for a Wireless Power Transfer (WPT) system includes plural capacitive loops, and LC-circuits that each have mutual inductances in non-resonant modes of operation.

20 Claims, 4 Drawing Sheets

(56) References Cited

U.S. PATENT DOCUMENTS

| | | |
|---|---|---|
| 2018/0219427 A1 | 8/2018 | Baek et al. |
| 2019/0054401 A1 | 2/2019 | Bonifas et al. |
| 2019/0244726 A1 | 8/2019 | Basit |
| 2020/0127494 A1* | 4/2020 | Stevens .................. H02J 50/90 |
| 2021/0119494 A1 | 4/2021 | Mao et al. |
| 2023/0378813 A1 | 11/2023 | Plekhanov et al. |
| 2024/0006093 A1 | 1/2024 | Plekhanov et al. |

OTHER PUBLICATIONS

Matos, Taina, Authorized Officer, Commissioner for Patents, "Written Opinion of the International Searching Authority" in connection with related International Application No. PCT/US2024/015868, dated Jul. 2, 2024, 3 pages.

Johnson, Ryan, Authorized Officer, "Commissioner for Patents", "Written Opinion of the International Preliminary Examining Authority"in connection with related International App. No. PCT/US2024/015868, dated Mar. 5, 2025, 4 pgs.

\* cited by examiner

Dipole parasitic E-field configuration

Quadrupole parasitic E-field configuration - rotation on 180

Hexapole parasitic E-field configuration 12-pole parasitic E-field configuratoin - rotation on 60 degrees

HYBRID EM-LC RESONATOR

CROSS-REFERENCE TO RELATED APPLICATIONS

This application claims priority to U.S. Provisional Patent Application Ser. No. 63/310,080, filed Feb. 14, 2022, the disclosure of which is incorporated herein by reference.

CROSS-REFERENCES TO MATERIALS INCORPORATED BY REFERENCE

Also incorporated herein by reference are the following U.S. patent applications: (1) U.S. patent application Ser. No. 18/161,817, filed Jan. 30, 2023; (2) U.S. patent application Ser. No. 16/581,559, filed Sep. 24, 2019; and (3) U.S. Provisional Patent Application Ser. No. 63/484,990, filed Feb. 14, 2023.

INTRODUCTION

One of the inventions is a hybrid EM-LC resonator for a Wireless Power Transfer (WPT) system, which resonator includes capacitive loops and mutual inductances of LC-circuits in non-resonant modes of operation. That resonator is usable in a wireless-energy transmission system. That system includes transmitter and receiver antenna components, each of which include at least two circuits isolated from each other. One way to isolate the circuits is to place them at a preselected distance from each other, as shown in the figure below. The requirement is to separate the circuits sufficiently to allow for a relatively loose coupling between them.

Each of the circuits is an LC one with the same resonant frequency, and each circuit is powered by the same power-frequency source via a parallel or serial connection to a power-frequency generator. The resonant frequency of the system is relatively low because of the electromagnetic interaction between the LC-circuits, and those LC circuits share inductance and capacitance, which causes a decrease of effective reactive impedance of the antenna.

BRIEF DESCRIPTION OF THE FIGURES

FIG. 4 shows an embodiment in which one of two loops, in a two-loop structure, composed of one capacitance and one inductance, is rotated 180 degrees to create a quadrupole configuration of the parasitic E-field in contrast to a dipole configuration of another embodiment that is also shown in FIG. 4 to the left of the quadrupole configuration. Like FIG. 4, FIG. 5 shows two embodiments of the invention, comparing the hexapole configuration of FIG. 3 to an embodiment in which one of two loops, in a two-loop structure, composed of three capacitances and three inductances, is rotated 60 degrees to change a hexapole configuration to 12-pole configuration.

VERSIONS OF INVENTIONS

Figure 1:
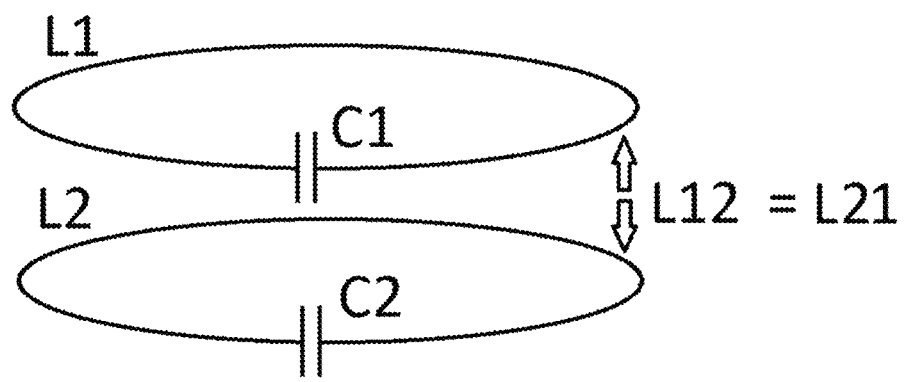
FIG. 1 is a schematic diagram that shows an embodiment of the system of the invention that produces a voltage-up effect because it causes an increase of induced voltage without requiring a conventional step-up transformer.

In one version of the system, shown in FIG. 1, a frequency of operation is 120 KHz and the self-resonant frequency of each LC-circuit is 200 kHz. Circuit 1 has an inductance L1 and a capacitance C1 and circuit 2 has an inductance L2 and a capacitance C2. Each LC-circuit operates at a frequency substantially below its resonant frequency, which causes each LC-circuit to have capacitive impedance, i.e. each LC-circuit is capacitive loop itself during system operation. The inductance of the system is the mutual inductance of the LC-circuits, which means the system inductance is not associated with wires, but is instead associated with EM interaction of wires. The construction of this system also causes substantially increased density of the EM-fields generated by the system, almost double the density of conventional systems. The increased density is due to the loose coupling and anti-damping. The anti-damping occurs because these circuits generate same-phase EM fields, which increases the total densities of the EM-field. Put another way, the self-resonant frequency of a single circuit is much higher than resulting frequency of operation. The system produces a voltage-up effect because it causes an increase of induced voltage without requiring a conventional step-up transformer.

The system is a hybrid EM-LC resonator, not a simple LC-resonator or EM-resonator, because of the capacitive behavior of each single LC-circuit, and because the resonant frequency of the system is much lower than resonant frequency of each single LC-circuit. To achieve this system functionality, the LC-circuits are located at a pre-selected distance to achieve non-resonant, relatively loose coupling between the circuits at frequency substantially below a self-resonant frequency. The pre-selected distances are 5%-25% of the size of LC-circuits, each of which are preferably formed as a circle or loop. For example, a system with plural transmitters, each formed with 3 m-diameter circular or loop shapes, are spaced apart at a 30 cm distance between planes containing the loops in a coaxial configuration with a first loop positioned above a second loop, and so on, for as many transmitters in the system. A typical range of the frequency associated with the loose coupling is 1.3 to 1.8 times lower than the self-resonant frequency.

Unlike the inventions in the system described in this application, conventional wireless energy transmission systems utilize resonant coupling of resonant LC-circuits for which transmitting and receiving LC resonators have the same frequency of resonance. Unlike those conventional systems, the hybrid EM-LC resonator invention has a frequency of resonance associated with each LC-circuit that is substantially greater than the operational frequency (the frequency associated with the system). The hybrid EM-LC resonator invention can be used as a transmitter or receiver, and it includes plural LC-circuits, with no galvanic connection between them. Each LC-circuit has its own resonance frequency, and each LC circuit in the system has the same resonance frequency. The resonance frequency of each LC-circuit is higher than the operational frequency. Through EM interactions between the LC-circuits, those LC-circuits share impedances, which cause a decrease in the operational frequency, which frequency is then lower than the resonant frequency of each LC-circuit.

In addition to utilizing a wire-conducting, capacitively-loaded loop, the system described in this application achieves its functionality by also utilizes the specific three-dimensional structure of loops with their associated capacitive behavior.

In operation, each LC-circuit of the system has capacitive impedance. The EM-LC resonator of the system includes capacitive loops and mutual inductance of the LC-circuits, unlike conventional systems that use inductive loops The above-described hybrid EM-LC resonator can be used as transmitting antenna and/or a receiving antenna, and its advantages over conventional systems that use resonant-circuits-coupling or inductive loops include:

1. Densities of the EM-field generated by the EM-LC resonator are higher than those associated with conventional LC-resonators having the same voltage on capacity of a resonator. For one version of the system invention that included two LC circuits, each with a 3-meter diameter and placed 30 cm apart from each other, generated 1.8 times higher density of EM-field. For another version that included three LC-circuits placed 20 cm from each other, the system invention generated 2.6 times higher density of EM-fields keeping the same voltage at capacities of each circuit. The system invention causes a step-up effect in terms of induced EM-field, without increasing the voltage or the capacitances/inductances of each LC-circuit.

2. Magnetic field density in the space between the wires of the LC-circuits is decreased because of the opposite direction of the magnetic field generated by each wire. The result is that the total inductive voltage associated with the wires of the LC-circuits decreases (for the same current) due to the actual decrease of inductance of each wire related to the decrease of density of the magnetic field near the wire, while at the same time, the density of the EM-field associated with system operation is not affected. When the system operates, the current in the LC-circuits produces the same density of the EM-field and, at the same time, there is a decrease in voltage on capacitances/inductances of the LC-circuits, required for generation of such current/EM-field density.

Hybrid EM-LC Resonator that Increases
Stepping-Up Effect and Decreases EM-Noise

Figure 2:
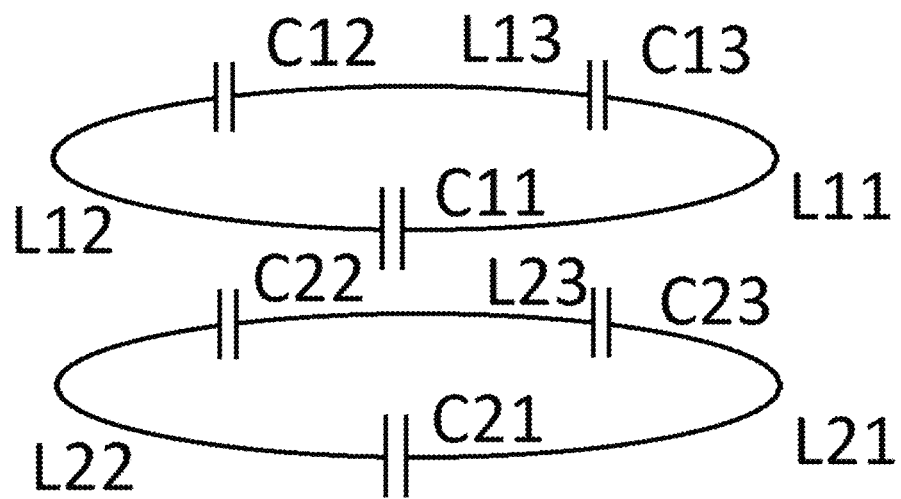
FIG. 2 is schematic diagram showing the structure of the hybrid EM-LC resonator of the invention.

The structure of the hybrid EM-LC resonator requires relatively high voltage applied to the capacitance of each LC-loop. To further decrease the voltage applied to the reactances of the LC-circuits, the capacitance and inductance of each loop can be split and distributed along the wire of the loop as shown in FIG. 2. Reactances of the LC-circuits means reactive resistance (including both capacitive resistance or inductive resistance).

In FIG. 2, each capacitance has to be changed so that total capacitance remains unchanged. For example, in a case where three equal capacitances are placed along the wire of a loop, each capacitance must be three times larger than initial (unsplit) capacitance, so that total capacitance remains unchanged, as shown by: C1=1/(1/C11+1/C12+1/C13). In another example where there is a parallel connection of a power-frequency generator to the LC-circuit, each capacitance has to be inversely proportional to the voltage that drives that capacitance. Generally, capacitances have to be driven by AC-power sources, galvanically insulated from each other. However, in a version where there are equal capacitances placed at an equal distance from each other along a wire of the loop, it is possible to drive all capacitances in parallel from the same power source i.e. without galvanic insulation. In that version, the loop can be made from smaller LC-resonators of the same impedances/frequencies connected in series. This will allow driving all LC-resonators of a single loop by the same voltage/current source due to the symmetry of the system, which also makes implementing this version of the system easier from an engineering point of view.

The system described in this application will also cause a decrease of any parasitic (i.e. non-usable) EM-field associated with an alternating charge on the wires of the loop. The focus of the system is on a vortex E-field induced in a volume around the system of loops. However, there is also non-used parasitic E-field generated by each loop. For example, if there is one capacitance and one wire in a loop, the AC surface charge on the loop will produce an electric dipole EM-field of a main power frequency. If there are three splits of the loop, an AC hexapole will be created as shown in FIG. 3.

Figure 3:
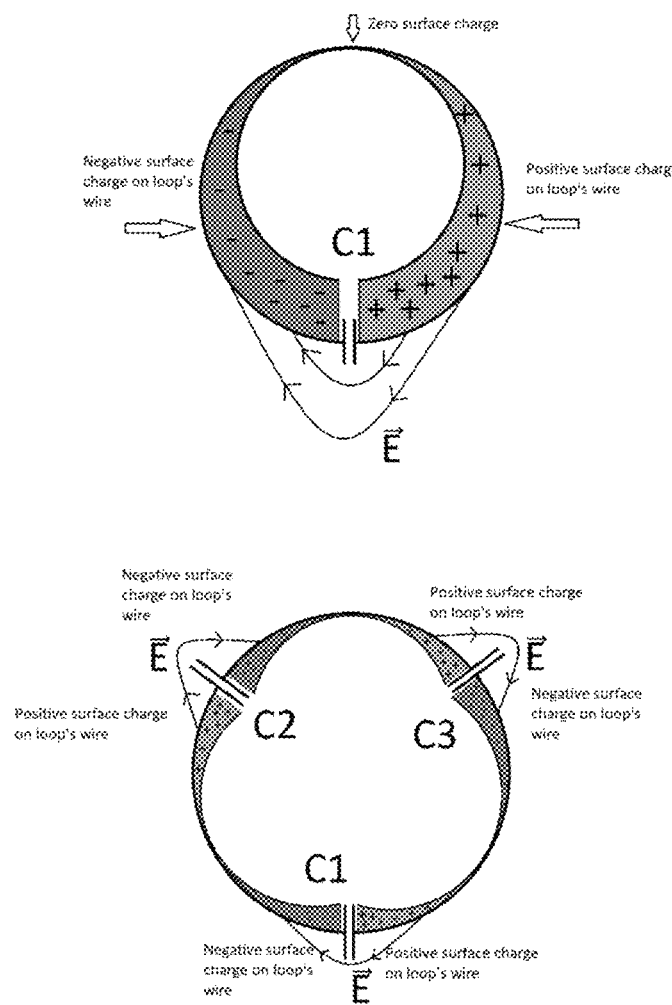
FIG. 3 is schematic diagram that shows, using another depicted embodiment of the system of the invention, how the invention will cause a decrease of any parasitic (i.e. non-usable) EM-field associated with an alternating charge on the wires of a loop in the system that has three splits that cause an AC hexapole to be formed.

In FIG. 3, the field of the hexapole has a much faster decrease with distance, and also, for the same AC current amplitude in the loop, the voltage on each capacitance of the loop will be three times lower (for equal capacities), which also causes a threefold decrease in the density of the parasitic EM-field produced by the system. Additional decrease in the undesired parasitic multipole E-field can be achieved by rotating the loops to a certain degree from each other. For example, rotating one of two loops (in a two-loop structure), composed of one capacitance and one inductance, 180 degrees will create a quadrupole configuration of the parasitic E-field instead of a dipole configuration as shown below, and rotating one of two loops (in a two-loop structure), composed of three capacitances and three inductances, 60 degrees will change a hexapole configuration to 12-pole configuration, and so on.

Figure 4:
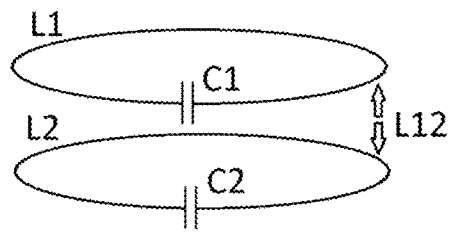
FIGS. 4 and 5 each show pairs of schematic diagrams of invention embodiments to illustrate how additional decreases in the undesired parasitic multipole E-field can be achieved by rotating the loops of the system.
Figure 4:
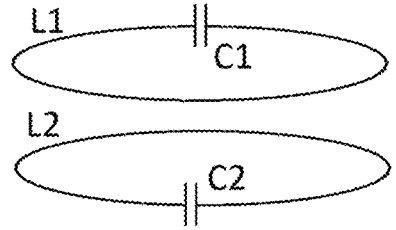
Figure 5:
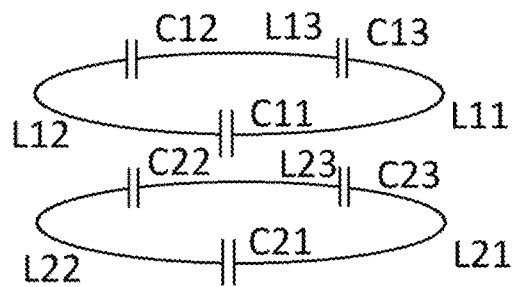
Figure 5:
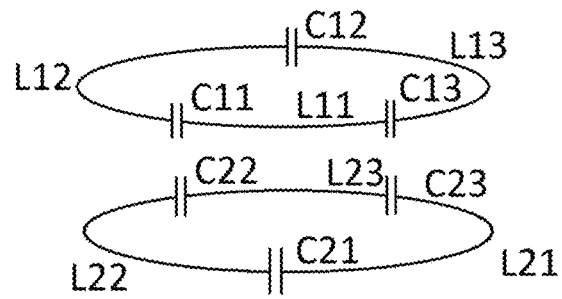

The approaches depicted in FIGS. 4 and 5 can be applied to any desired number of splits of each loop, including different number of splits for different loops, different capacitances spaced at different distances along the loop. It can also be applied to any desired number of loops to obtain higher multipole configurations, that will substantially decrease the parasitic E-field (associated with the alternating surface charge of the wires) over a distance.

Hybrid EM-LC Resonator that Decreases
Densities of EM-Field for Bio-Safety Reasons The above-described approaches cause decreased voltages on reactances of the loops and also decrease the parasitic E-field associated with alternating surface charge of wires. However, the densities of the main EM-field (a vortex EM-field in area around the antenna) is high. To decrease densities of the EM-field in areas where humans are present, active field suppression is used. To achieve active field suppression in the system described in this application, additional "damping" loops of current can be added to the system. Those loops typically have a diameter that is 2-3 times smaller than the other loops, and are placed co-axially with the antenna loops at a preselected distance from a plane through the loops of the antenna, typically at a distance of 1-2 diameters of the damping loops. Current in the damping loops flows in a direction that is opposite to the current flow in the antenna's primary loops. As a result, the damping-loops current produces the same EM-field at the same frequency, but has 180-degree phase shift compared to the primary-loops current. That means the field produced by the damping loops and field produced by antenna loops will cancel or at least partially suppress each other.

Figure 6:
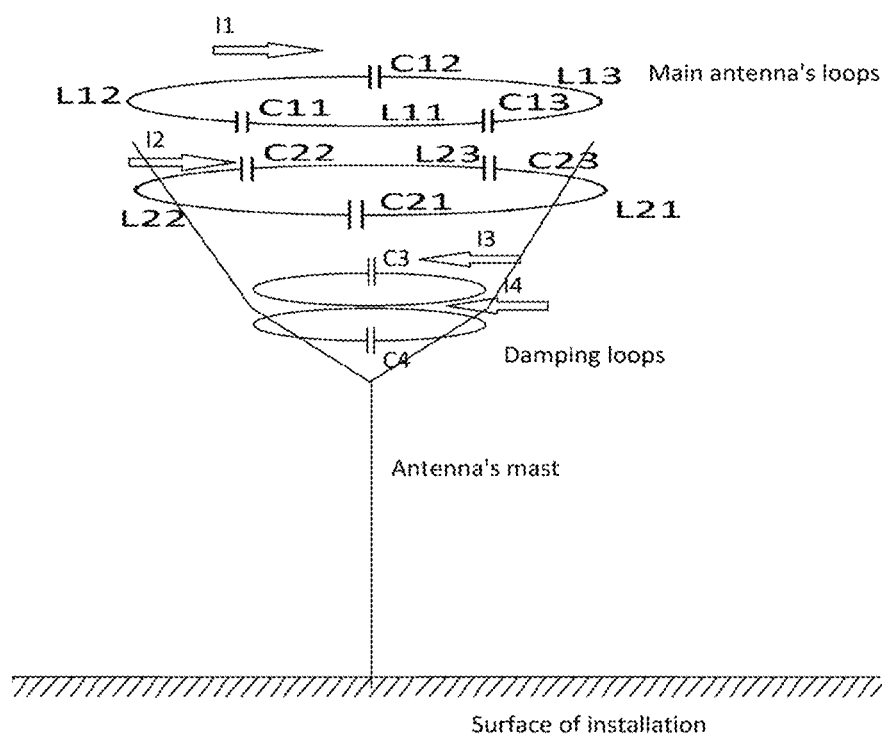
FIG. 6 is a schematic diagram of another embodiment showing that additional damping loops of current can be added to the system of the invention to achieve active field suppression.

By choosing an appropriate current level in the damping loops, and an appropriate geometry and placement of the damping loop, a substantial decrease in any resulting EM-field can be achieved in area where humans are present. For example, one version of the system has a transmitting antenna with a diameter of three meters, and includes two loops spaced 30 cm from each other, split on three equal parts using the technique described in the above section. Two damping loops, each with 1.5-meter diameters were positioned 1.5 meters below a plane containing the lower loop of the transmitting antenna, and spaced 30 cm from each other. The distance between the plane containing the lower loop of the transmitting antenna and the surface of installation (ground) was five meters. For this version, the optimal current in the damping loops was 120% of the current in loops of transmitting antenna, which caused a tenfold decrease of density of the EM-field at a height of one meter above the ground. A schematic diagram of that version is shown in FIG. 6.

The benefits of actively suppressing, for bio-safety reasons, the EM-field generated by the antenna of the system described in this application include:

1. The density of the suppressed EM-field at ground level and adjacent the antenna is sufficiently low to be safe for humans.

2. There is an increase in efficiency of the system's wireless energy transmission/receiving because the relatively low density of the EM-field at ground level also results in lower parasitic energy losses in the ground itself (caused by lower currents induced in the ground).

3. There is an increase in the power level/distance/efficiency of system's wireless energy transmission because of an increase in the density of the EM-field above the antenna. Although the EM-field of the damping loop will decrease (typically by 5%-15%) the density of the resulting EM-field above the transmitting antenna, that EM-field will also decrease (by 5-10 times) the density of the EM-field at ground level. Thus, there is a substantial increase in the current in the antenna, which causes a corresponding increase in the density of the EM-field above the antenna, but also maintains a safe density of EM-field at ground level.

For different diameters/locations (heights) of the antennas' loops and the damping loops, an appropriate current level can be established in the damping loop for maximum decrease of EM-field density to achieve bio-safety, such as to make an area safe for human presence.

The methods and systems set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

What is claimed:

1. A hybrid EM-LC resonator for a Wireless Power Transfer (WPT) system provided with a power frequency generator, the system comprising:
    plural capacitive loops;
    LC-circuits that are configured for connection to the power frequency generator for current flow in a first direction and that each have mutual inductances in non-resonant modes of operation and
    at least one damping loop defining a diameter and configured for connection to the power frequency generator for current flow in a second direction that is opposite the first direction.

2. The system of claim 1 wherein the plural capacitive loops are placed co-axially relative to one another.

3. The system of claim 2 wherein the at least one damping loop is placed co-axially relative to the plural capacitive loops.

4. The system of claim 2 further comprising a second damping loop.

5. The system of claim 4 wherein the second damping loop is placed co-axially relative to the plural capacitive loops.

6. The system of claim 4 wherein the damping loops have substantially the same diameter.

7. The system of claim 1 wherein the plural capacitive loops have substantially the same diameter and wherein the at least one damping loop has a diameter that is smaller than the diameter of the plural capacitive loops.

8. The system of claim 7 wherein the diameter of the at least one damping loop is no more than about one-half of the diameter of the plural capacitive loops.

9. The system of claim 7 wherein the diameter of the at least one damping loop is at least about one-third of the diameter of the plural capacitive loops.

10. The system of claim 1 wherein the at least one damping loop has a diameter and is coaxially spaced from the plural capacitive loops by a distance that is no more than about the same as the diameter.

11. An antenna incorporating a hybrid EM-LC resonator for a Wireless Power Transfer (WPT) system provided with a power frequency generator, the antenna configured for installation on a surface, the antenna comprising:
    a first capacitive loop defining a first diameter and configured to be installed substantially parallel to the surface;
    a second capacitive loop defining a second diameter substantially equally to the first diameter, the second capacitive loop placed coaxially relative to the second capacitive loop;
    LC-circuits that each have mutual inductances in non-resonant modes of operation and
    at least one damping loop defining a diameter, the at least one damping loop placed co-axially relative to the first and second capacitive loops.

12. The system of claim 11 wherein the first and second capacitive loops are configured for connection to the power frequency generator for current flow in a first direction and the at least one damping loop is configured for connection to the power frequency generator for current flow in a second direction that is opposite the first direction.

13. The system of claim 11 further comprising a second damping loop.

14. The system of claim 13 wherein the second damping loop is placed co-axially relative to the first and second capacitive loops.

15. The system of claim 13 wherein the damping loops have substantially the same diameter that is smaller than the diameter of the first and second capacitive loops.

16. The system of claim 15 wherein the diameter of the damping loops are no more than about one-half of the diameter of the first and second capacitive loops.

17. The system of claim 15 wherein the diameter of the at least one damping loop is at least about one-third of the diameter of the first and second capacitive loops.

18. The system of claim 13 wherein the damping loops are coaxially spaced from one another by a distance that is no more than about one-fifth the diameter of the damping loops.

19. An antenna incorporating a hybrid EM-LC resonator for a Wireless Power Transfer (WPT) system provided with a power frequency generator, the antenna configured for installation on a surface, the antenna comprising:
   a first capacitive loop defining a first diameter and configured to be installed substantially parallel to the surface;
   a second capacitive loop defining a second diameter substantially equally to the first diameter, the second capacitive loop placed coaxially relative to the second capacitive loop at a distance that is about one-tenth the diameter;
   LC-circuits that each have mutual inductances in non-resonant modes of operation and
   at least one damping loop defining a diameter, the at least one damping loop placed co-axially relative to the first and second capacitive loops.

20. The system of claim 19 wherein the plural capacitive loops are configured for connection to the power frequency generator for current flow in a first direction and the at least one damping loop is configured for connection to the power frequency generator for current flow in a second direction that is opposite the first direction.

* * * * *